United States Patent [19]

Lautzenhiser

[11] Patent Number: 4,513,618
[45] Date of Patent: Apr. 30, 1985

[54] GRAVITY GRADIOMETER AND METHOD

[75] Inventor: Theodore V. Lautzenhiser, Tulsa, Okla.

[73] Assignee: Standard Oil Company (Indiana), Chicago, Ill.

[21] Appl. No.: 364,740

[22] Filed: Apr. 2, 1982

[51] Int. Cl.³ .............................................. G01V 7/00
[52] U.S. Cl. ................................................. 73/382 G
[58] Field of Search .............. 73/382 G, 382 R, 517 B

[56] References Cited

U.S. PATENT DOCUMENTS

| 3,221,563 | 12/1965 | Wing | 73/517 B |
|---|---|---|---|
| 3,472,076 | 10/1969 | Howell et al. | 73/382 R |
| 3,508,445 | 4/1970 | Penney, Jr. et al. | 73/517 B |
| 3,630,086 | 12/1971 | Wilk | 73/382 G |
| 3,668,932 | 6/1972 | Hansen | 73/382 G |
| 3,722,285 | 3/1973 | Weber | 73/382 G |
| 3,731,537 | 5/1973 | Trageser | 73/382 G |
| 3,747,403 | 7/1973 | Yungul | 73/151 |
| 3,926,054 | 12/1975 | Buck | 73/382 G |
| 4,023,413 | 5/1977 | Stauber | 73/382 R |
| 4,399,693 | 8/1983 | Gournay | 73/152 |

FOREIGN PATENT DOCUMENTS 162671 10/1964 U.S.S.R. ............................ 73/382 G

Primary Examiner—James J. Gill

[57] ABSTRACT

Method and apparatus for determining the vertical gradient of the vertical gravitational field by a single measurement, for example, adjacent an earth formation of interest, are provided.

14 Claims, 6 Drawing Figures

GRAVITY GRADIOMETER AND METHOD

BACKGROUND OF THE INVENTION

1. Field of the Invention

The invention relates to gravitational field measurements. In one aspect, the invention relates to apparatus and method for measuring the vertical gradient of the vertical gravitational field. In another aspect, the invention relates to such apparatus and method suitable for use in oil and gas exploration, for example, in a borehole.

2. Background of the Invention

The measurement of gravity gradients is of great importance in several technological areas. For example, the mapping of horizontal and vertical gradients finds applications in geophysical investigations, such as prospecting for oil and other minerals.

It is known among geophysicists, for example, that various subsurface structures often indicate mineral deposits, such as oil, gas, and the like, and, further that minute variations in the gravitational field occur in the area of these subsurface structures. In this respect, it is well known that an instrument for continuously measuring the vertical gravity gradient in an oil well environment would permit exploration geophysicists and petrology engineers to differentiate, for example, gas and water bearing strata in the vicinity of a borehole. Accordingly, various instruments have been devised to measure the earth's gravity field and/or components thereof and gradient changes therein with the object of determining the location and extent of such deposits.

One prior art method for determining the vertical gravity gradient for well-logging purposes requires a detailed gravity survey using gravitational field intensity measurements made at two depths typically with a minimum separation, between the two depths on the order of several feet, by a borehole gravimeter, followed by the appropriate calculation to generate the gradient. This method of determining the gravity gradient is time consuming and is inherently incompatible with continuous well-logging practice.

Various other prior art methods and apparatus are also known, such as, for example, those set forth in U.S. Pat. No. 3,630,086 (1971), U.S. Pat. No. 3,668,932 (1972), U.S. Pat. No. 3,926,054 (1975).

Highly desirable are new methods and apparatus for determining gradients directly at the point of reading. Particularly desirable are such methods and apparatus for measuring the vertical gradient of the vertical gravitational field which can be utilized in the vicinity of a borehole for oil and gas exploration, as well as in other applications. Such methods and apparatus for such uses are provided by the invention hereinbelow described.

SUMMARY OF THE INVENTION

According to the invention, the vertical gradient of the vertical gravitational field is determined by producing a signal representative of the vertical gradient only of the vertical gravitational field.

According to one aspect of the invention, apparatus is provided including a housing containing a fluid, and float means suspended in the fluid for responding to the vertical gradient of the vertical gravitational field by producing a force which is representative of the vertical gradient only of the vertical gravitational field and which tends to vertical displacement of the float means in the fluid.

According to another aspect of the invention, a method for determining the vertical gradient of the vertical gravitational field is provided comprising generating a force acting on a mass suspended in a fluid, the force being representative of the vertical gradient only of the vertical gravitational field and tending to vertical displacement of the mass in the fluid, and sensing the force by means responsive to the position of the mass for generating a signal representative of the vertical gradient only of the vertical gravitational field.

According to further aspects of the invention, are such method and apparatus for determining the vertical gradient of the vertical gravitational field in the vicinity of a borehole for purposes of oil and gas exploration.

According to yet a further aspect of the invention, the invention comprises, in a method for determining the density of a formation in the earth, the step of determining the vertical gradient of the vertical gravitational field ($\partial g_z/\partial z$) at each point adjacent the formation that a measurement is taken.

According to another aspect of the invention is a method for determining the density of a formation in the earth comprising lowering a sonde in the vicinity of the formation; and determining the vertical gradient of the vertical gravitational field ($\partial g_z/\partial z$) at each point adjacent the formation that a measurement is taken.

According to another aspect of the invention is apparatus for determining the density of formations in the earth comprising (a) first means for generating a signal representative of the vertical gradient of the vertical gravitational field ($\partial g_z/\partial z$) at each point that a measurement is taken; and (b) second means for transmitting the signal to a receiver.

As used herein, "null position" means a position of the float means in reference to which a signal representative of the vertical gradient of the vertical gravity field is determined in accordance with the invention.

DETAILED DESCRIPTION OF THE DRAWINGS

Figure 1:
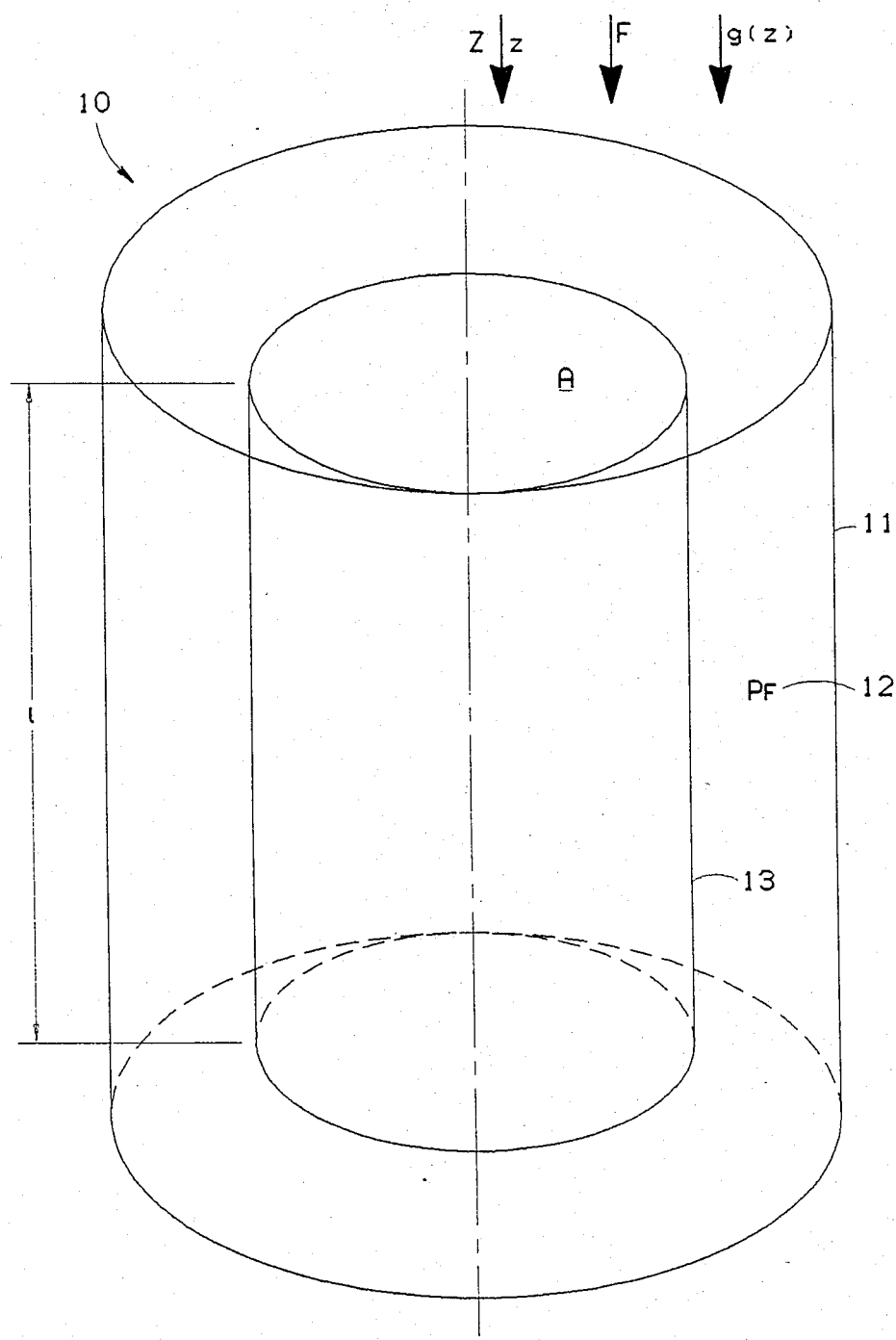
FIG. 1 illustrates, diagrammatically, certain principles of the invention.

Referring now to FIG. 1 in detail, reference numeral 10 refers generally to a responder in accordance with the invention simplified to illustrate certain principles of the invention. Responder 10 comprises an external housing 11, in the illustrated embodiment, an enclosed circular cylinder having a vertical axis z, containing a fluid 12 having density $\rho_f$. Suspended in the fluid 12 is a float 13. The mass of the float 13 is supported against the forces of gravity and acceleration by its buoyancy in a thin layer of the fluid 12 between the float 13 and the housing 11. The float 13 is such that the weight of the float 13 is nearly exactly supported by its buoyancy, that is, for the right circular cylindrical float of the illustrated embodiment $$W \approx A \int_T^B \rho(z) g(z) \, dz$$

where W is the weight of the float 13, A is the cross sectional area, $\rho(z)$ is the density of float 13 along axis z, $g(z)$ is the gravitational attraction on float 13 along axis z when the axis z is aligned with the vertical z, and the integral is taken from the top (T) to the bottom (B) of the float 13. The float 13 is preferably balanced so that the float 13 is centered longitudinally, for example, with respect to housing 11 or, for example, with respect to the radial plate 20 discussed below in reference to FIG. 2.

Variations in the vertical gradient of the vertical gravitational field ($\partial g_z/\partial z$) produces a force F tending to displace the float 13 along the vertical axis z as will be shown in further detail below.

The force F tending to vertical displacement of float 13 can be measured by any of several techniques. Preferred is a technique such as, for example, application of an electrostatic force applied to the float 13 where the field strength necessary to maintain the float 13 in the same, preferably centered, "null" position with respect to fluid 12 would be the measured quantity.

Figure 2:
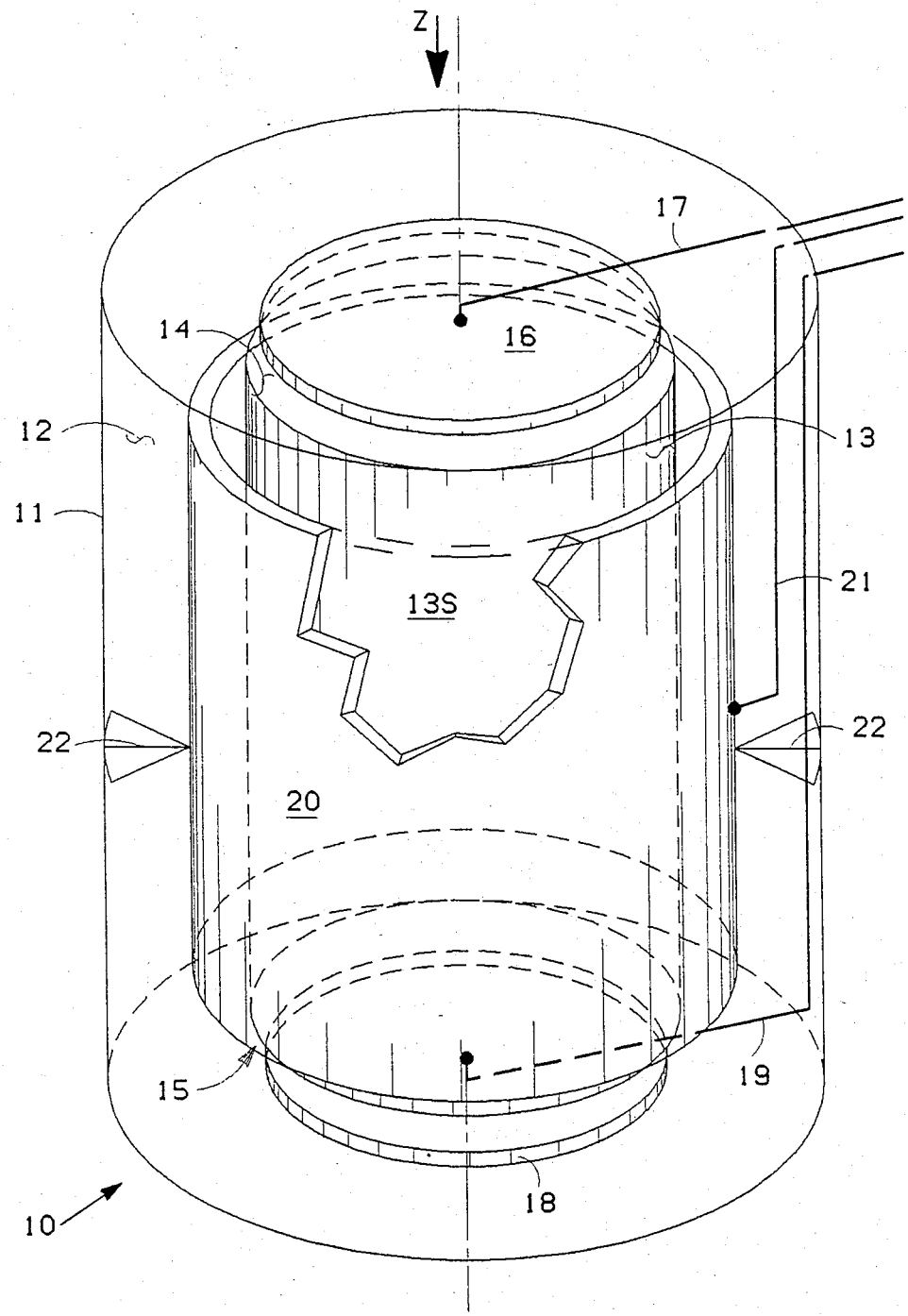
FIG. 2 illustrates, in perspective, a responder to the vertical gradient of the vertical gravitational field ($\partial g_z/\partial z$) in accordance with the invention.

Referring now to FIG. 2, FIG. 2 represents generally an embodiment of a responder 10 in accordance with the invention. Housing 11 has vertical axis z and contains fluid 12 and float 13 as in FIG. 1. Float 13 is preferably a generally hollow right circular cylinder made of a dimensionally stable non-ferromagnetic material having an electrically conductive material at least on the surface thereof. Various cermets (semisynthetic products consisting of a mixture of ceramic and metallic components) are non-ferromagnetic, show excellent dimensional stability, and are suitable for use in the float 13 in accordance with the invention. The electrically conductive material can be such as, for example, gold, silver, and the like, which are sufficiently malleable to accommodate temperature variations. Preferably float 13 has a generally planar first upper end surface or plate 14 and a generally planar first lower end surface or plate 15. Preferably most of the mass of float 13 is adjacent lower end plate 15 and is distributed evenly about the longitudinal axis z of the cylinder 11 so that the float 13 is a low mass-high mass dipole along the longitudinal axis z. A non-ferromagnetic massy material such as, for example, tantalum or gold, can be employed to provide the appropriate mass distribution. Unconstrained, such a dipole will orient its longitudinal axis z parallel to the vertical component Z of the vertical gravity field in the fluid 12. Adjacent and spaced apart from first upper end plate 14 is a generally circular second upper end plate 16 having electrical lead 17. Adjacent and spaced apart from first lower end plate 15 is a generally circular second lower end plate 18 having electrical lead 19. Adjacent and spaced apart from the radial suface 13S of float 13 is a generally cylindrical radical plate 20 having lead 21 and supported in housing 11 by supports 22.

Preferably plates 16 and 18 have diameters slightly less than the diameter of float 13 so that edge effect will facilitate centering of float 13 in housing 11 relative to plates 16 and 18. The length of float 13 is preferably slightly longer than the length of radial plate 20 so that the capacitance developed between radial surface 13S of float 13 and radial plate 20 remains substantially constant with small changes in the position of float 13 and to minimize the tendency of the electrostatic force developed between float 13 and radial plate 20 to displace float 13 vertically. Preferably the weight of float 13 is adjusted, as indicated, so that the float 13 is about centered longitudinally with respect to radial plate 20 ("null" position). Alternatively, float 13 can be, for example, electrostatically forced to achieve a longitudinally centered, null position. All of the plates 16, 18, and 20 are made of or at least possess a surface made of an electrically conductive material. Preferably all of elements 13, 16, 18 and 20 are coaxial with the vertical axis z of housing 11.

First upper end plate 14 and second upper end plate 16 form a first capacitive element C1. First lower end plate 15 and second lower end plate 18 form a second capacitive element C2. Radial surface 13S and radial plate 20 form a third capacitive element C3.

As indicated in further detail below, a change in the vertical component of the vertical gravitational field will cause a change in the vertical force acting on the float 13. When axis z of cylinder 11 is aligned with the vertical gravity field, the force developed will tend to displace the float 13 from its centered null position toward one or another of second upper end plate 16 or second lower end plate 18 causing a change in capacitance in capacitive elements C1 and C2 so that C1 and C2 can be modeled as variable capacitive elements varying responsive to the vertical gradient of the vertical gravity field ($\partial g_z/\partial z$).

Figure 3:
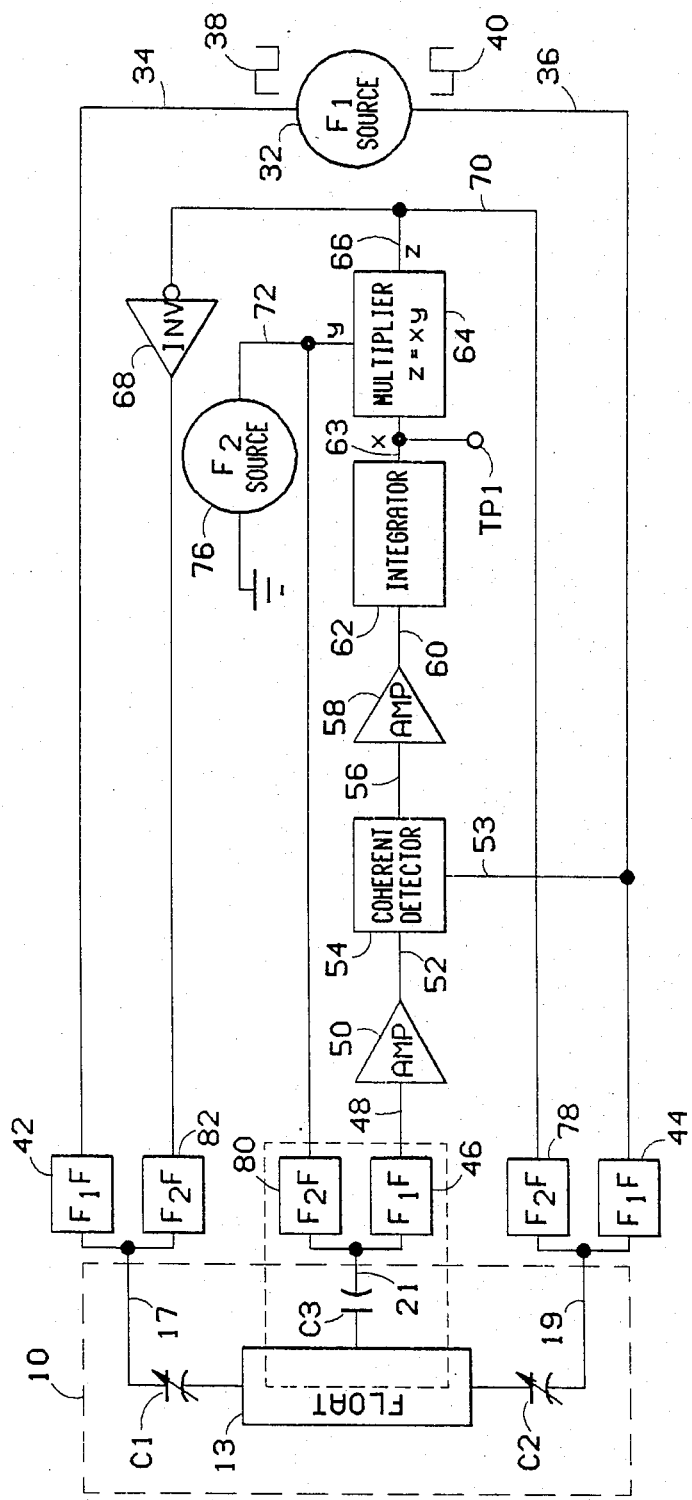
FIG. 3 illustrates schematically apparatus and method for measuring the vertical gradient of the vertical gravitational field ($\partial g_z/\partial z$) in accordance with the embodiment of FIG. 2.

FIG. 3 schematically illustrates apparatus and method in accordance with the invention utilizing responder 10' for measuring the vertical gradient with the vertical gravity field. Responder 10' comprises first variable capacitive element C1 with electrical lead 17, second variable capacitive element C2 with electrical lead 19, and third capacitive element C3 with electrical lead 21. Float 13, having at least the surface made of an electrically conductive material, completes the circuit so that one plate of each C1, C2, and C3 are effectively electrically common.

In the illustrated embodiment of FIG. 3, a first frequency F1 is employed for sensing the position of float 13 while a second frequency F2 is employed for forcing the float 13 back to its centered null position. Referring again to FIG. 3, reference numeral 32 indicates the F1 source, for example a square wave generator having a frequency of 30 KHz, having two outputs 34 and 36 which are equal in amplitude and 180° out of phase as illustrated by waveforms 38 and 40 respectively. One output of source 32 is applied to variable capacitance C1 through F1 filter 42 and the other output, 180° out of phase, is applied to variable capacitance C2 through F1 filter 44.

The F1 signals thus applied to C1 and C2 are summed on radial plate 20 of float 13 shown in FIG. 2 and, referring again to FIG. 3, are coupled via capacitance C3, lead 21, F1 filter 46, and lead 48 to amplifier 50. The amplifier 50 output is electrically connected by lead 52 to coherent detector 54. Coherent detector 54 also receives an input from source 32, in the illustrated embodiment via leads 36 and 53. Coherent detector 54 is functional for comparing the signals on lead 52 and lead 53 and for producing an output signal on lead 56 which is representative of the voltage difference between the two signals by demodulating the capacitor plate 20 signal and producing a direct current (DC) voltage signal whose polarity and magnitude are determined by the direction and magnitude, respectively of the displacement of the float 13. Coherent detectors capable of performing such functions are well known and need not be further described.

The signal on lead 56 is representative of the position of float 13 and further is employed to generate a signal for returning float 13 to its centered null position.

In the illustrated embodiment, the output signal of coherent detector 54 is amplified by amplifier 58 and the output at line 60 is provided to a lead-lag filter 62 which functions to prevent feedback loop oscillation and to generate a signal used to generate the forcing signal for returning float 13 to its centered null position.

The output of lead-lag filter 62 is proportional to the vertical gradient (component) of the vertical gravitational field and a signal representative of the vertical component of the vertical gravitational field can be taken off at that point, for example, as illustrated at TP1. The outpt of lead-lag filter 62 is provided as one input via lead 63 to multiplier 64. F2 square wave generator 76 provides a second input to multiplier 64 via lead 72.

When float 13 at its centered null position is equidistantly spaced from each of plate 16 and 18 the output signal from coherent detector 54 will be zero. When a change in the vertical component of the vertical gravity field produces a vertical displacement in float 13, the output of coherent detector 54 will be, as indicated, a DC voltage whose polarity and magnitude are determined by the displacement of float 13. The output of lead-lag filter is provided to multiplier 64 as the $\bar{x}$ signal and an output of F2 source 76 having a frequency, for example of 1 KHz, is provided to multiplier 64 as the $\bar{y}$ signal. The product signal $z=xy$ of multiplier 64 is provided by lead 66 and inverter 68 to F2 filter 82 and lead 17 to first capacitive element C1 and is also provided by lead 70, F2 filter 78, and lead 19 to second capacitive element C2. The output of F2 source 76 is also provided by F2 filter 80 and lead 21 to third capacitive element C3. By this arrangement a restoring force is applied to the capacitive elements to return float 13 to the centered null position.

Figure 4:
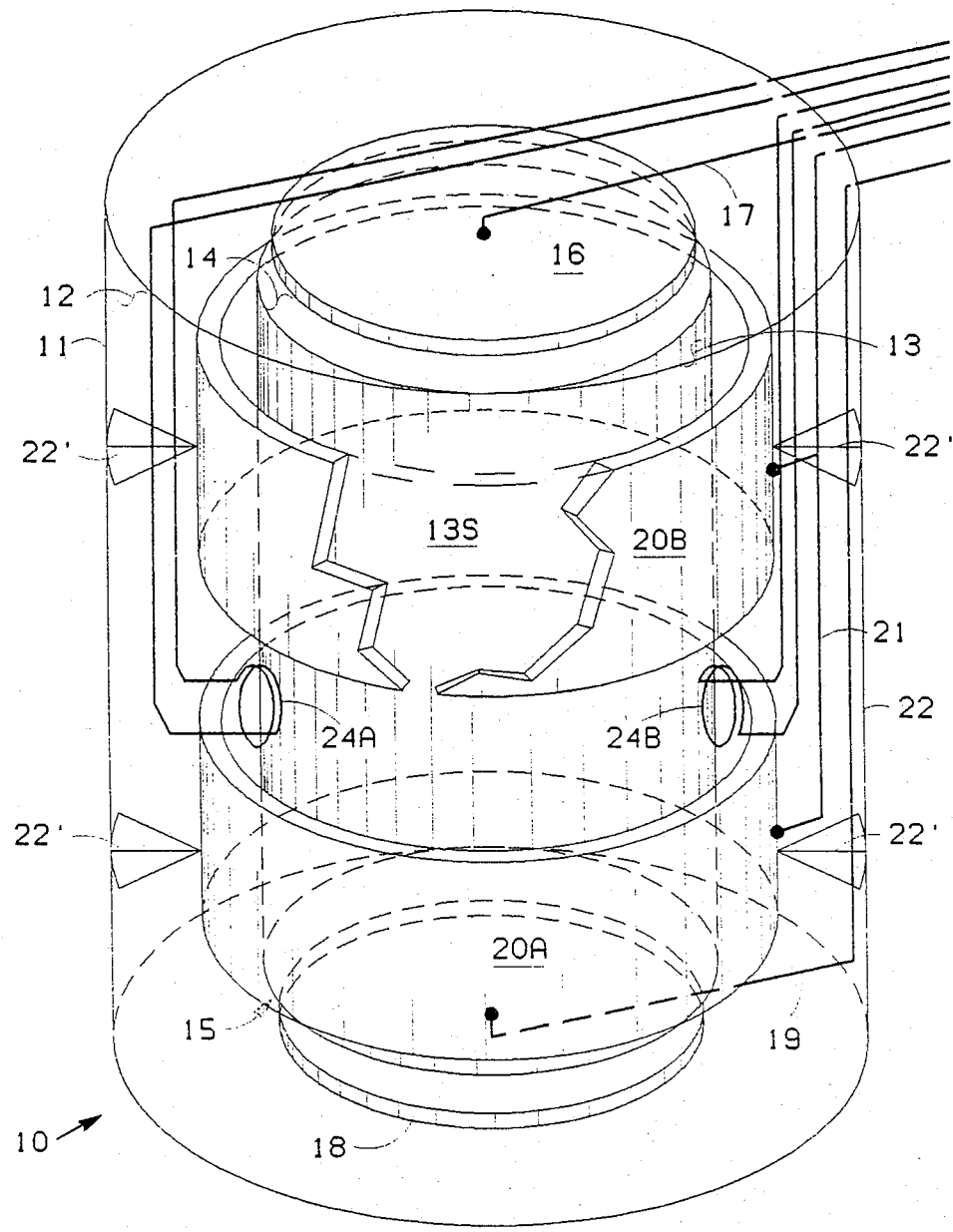
FIG. 4 illustrates, in perspective, a responder to the vertical gradient of the vertical gravitational field ($\partial g_z/\partial z$) in accordance with a preferred embodiment of the invention.

FIG. 4 represents a preferred embodiment of the responder in accordance with the invention. Generally, FIG. 4 corresponds to FIG. 2 and numbering for reference purposes similarly corresponds. In FIG. 4, however, plate 20 is represented by two cylindrical plates 20A and 20B, which are, for example, externally electrically connected, having a gap 20G therebetween adjacent the central portion of float 13. Adjacent float 13 in gap 20G are, for example, coils 24A, 24B and 24C (not shown) preferably equidistantly spaced apart which are functional for maintaining float 13 vertically coaxial with respect to the vertical axis z. In the illustrated embodiment coils 24A. 24B, and 24C are oriented with open ends of the coils adjacent float 13. However, other embodiments, for example, coils encircling float 13, and the like will be apparent to persons skilled in the art.

Figure 5:
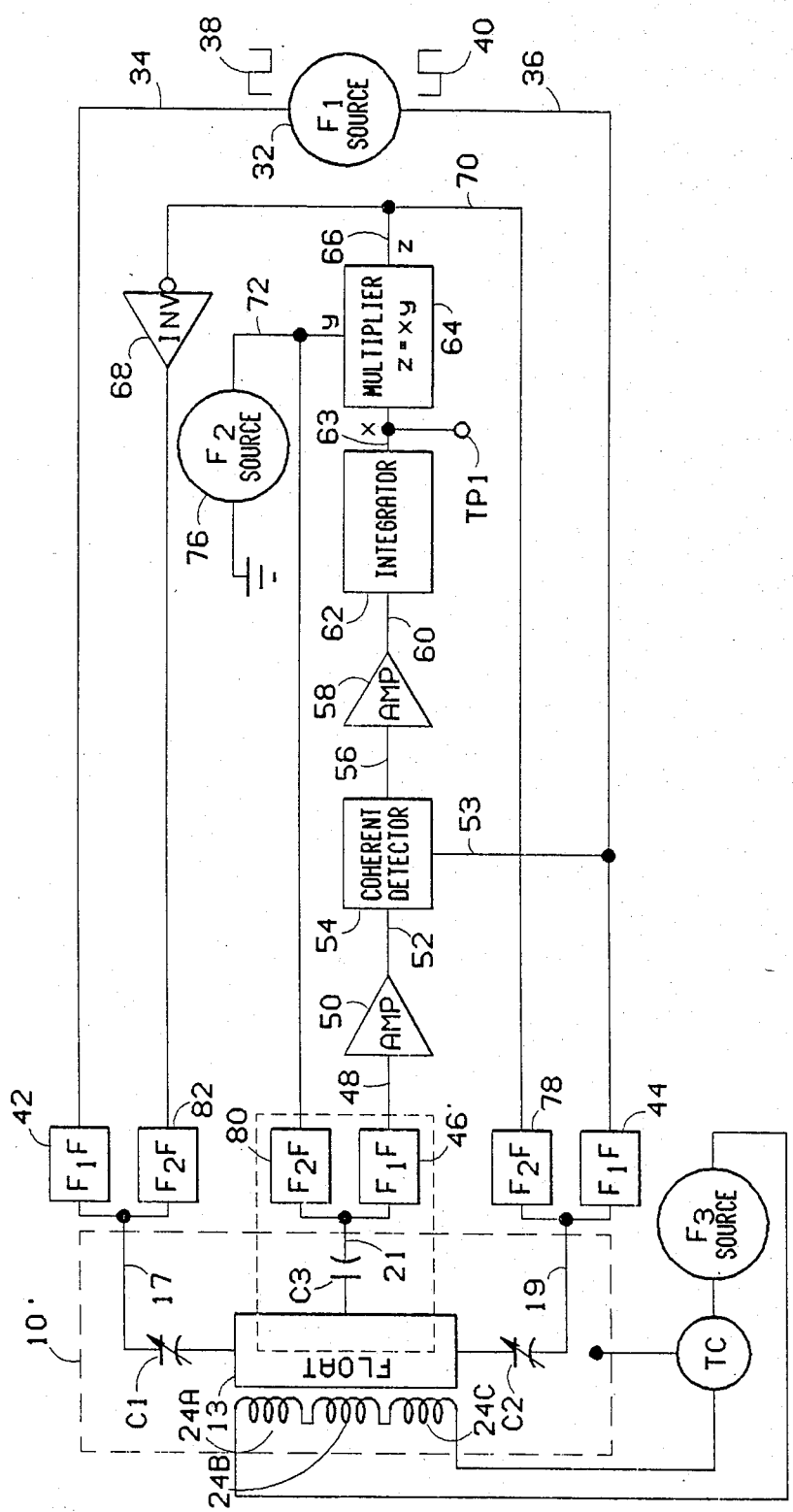
FIG. 5 illustrates schematically apparatus and method for measuring the vertical gradient of the vertical gravitational field ($\partial g_z/\partial z$) in accordance with the embodiment of FIG. 4.

Referring now to FIG. 5, FIG. 5 represents schematically apparatus for measuring the vertical gradient of the vertical gravitational field in accordance with the embodiment of FIG. 4. FIG. 5 corresponds to FIG. 3 except for the presence of coils 24A, 24B, and 24C connected in series to oscillator F3 having a frequency, for example, of 1 MHz and having a magnitude controlled by temperature controller TC having a sensor within the responder housing. The electromagnetic field induced in the equally spaced coils 24A, 24B, and 24C by F3 source causes the float to be coaxial to the vertical axis of the responder 10 and eddy currents induced in the conductive surfaces can be utilized for temperature control.

To further illustrate the invention, the following synthetic examples are provided:

SYNTHETIC EXAMPLE I

VERIFICATION

Referring to FIG. 1 consider a cylindrical float 13 having cross sectional area A and length l with a density distribution $\rho(z)$ where z is along the longitudinal axis of float 13 in the direction illustrated and is immersed in a fluid of density $\rho_f$.

The force F acting downward on the cylinder is $$F = P_T A + \int_T^B \rho(z) \, A \, g(z) \, d(z) - P_B A \tag{1}$$

where $P_T$ and $P_B$ are the fluid pressures at the top and bottom of the float respectively, the integral is taken from the top (T) to the bottom (B) of the float and $g(z)$ is the vertical gravity field as a function of z. In an incompressible fluid, $$P_B = P_T + \int_T^B \rho_f g(z) \, dz \tag{2}$$

where $\rho_f$ is the density of fluid 12, so $$F = A \int_T^B \rho(z) \, g(z) \, dz - A\rho_f \int_T^B g(z) \, dz. \tag{3}$$

Let $g(z) = g(o) + z \frac{\partial g}{\partial z}$, (4)

a first order Taylor expansion, (where g(o) is the gravity function at end plate 14) of float 13, then $$F = g(o) \left[ A \int_T^B \rho(z) \, dz - A\rho_f \int_T^B dz \right] + \tag{5}$$

$$\frac{\partial g}{\partial z} \left[ A \int_T^B \rho(z) \, z \, dz - A\rho_f \int_T^B z \, dz \right].$$

Now, $\int_T^B \rho(z) \, A \, dz = M_B;$ (6)

i.e., the density of the body integrated over the volume of the body $V_B$ ($Al=V_B$) is the mass of the body, $M_B$.

And $\rho_f \int_T^B A \, dz = \rho_f V_B.$ (7)

Therefore, $$F = g(o)(M_B - \rho_f V_B) + \tag{8}$$

$$\frac{\partial g}{\partial z}\left[\int_T^B A\rho(z)z\,dz - \rho_f \int_T^B Az\,dz\right].$$

To evaluate the coefficient of the $\partial g/\partial z$ term we assume a density function $\rho(z)$. For purposes of calculation assume the float 13 is a hollow closed end cylinder comprising infinitesimally thin walls with the bottom of the hollow cylinder filled with a material of density $\rho_B$. Then, defining $1_i$ as follows, $$\rho(z) = 0 \text{ for } 0 \leq z < 1_i$$

$$\rho(z) = \rho B \text{ for } 1_i < z \leq 1, \tag{9}$$

then $$\int_T^B A\rho(z)z\,dz = \int_T^{1_i} A(o)z\,dz + \int_{1_i}^B A\rho_B z\,dz$$

or $$\int_T^B A\rho(z)z\,dz = \frac{\rho_B A}{2}(1^2 - 1_i^2) \tag{10}$$

and $$\rho_f \int_T^B Az\,dz = \frac{\rho_f A}{2} 1^2. \tag{11}$$

Now $M_B = \rho_B A(1 - 1_i)$, \tag{12} so Equation (10) becomes $$\int_T^B A\rho(z)z\,dz = \frac{M_B}{2}(1 + 1_i). \tag{13}$$

Since $1^2 - 1_i^2 = (1 - 1_i)(1 + 1_i)$, and $A1 = V_B$, Equation (11) becomes $$\rho_f \int_T^B Az\,dz = \frac{\rho_f V_B}{2} 1. \tag{14}$$

So, substituting Equations (13) and (14) into Equation (8), $$F = g(o)[M_B - \rho_f V_B] + \frac{1}{2} \frac{\partial g}{\partial z}[M_B(1 + 1_i) - \rho_f V_B 1]. \tag{15}$$

Rearranging we have $$F = g(o)[M_B - \rho_f V_B] + \frac{1}{2} \frac{\partial g}{\partial z}[1(M_B - \rho_f V_B) + 1_i M_B]. \tag{16}$$

If we let $$M_B = \rho_f V_B, \tag{17}$$

we have $$F = \frac{1}{2} \frac{\partial g}{\partial z} l_i M_B. \tag{18}$$

Thus the force F acting on the float 13 vertically oriented in the vertical gravitational field is proportional to the vertical gradient of the vertical gravitational field.

SYNTHETIC EXAMPLE II

TEMPERATURE EFFECTS

Now, we consider the effect of temperature ($\Phi$). A fluid with low density dependence on temperature is water around its critical temperature (3.98° C.) where it has a density maximum. Around the critical temperature, the density of water can be expressed as $$\rho_f(\phi) \doteq \rho_f(3.98° \text{ C.})(1 - \beta(\phi - 3.98° \text{ C.})^2) \tag{19}$$

where $\beta$ is a mathematical expansion coefficient given by $\beta = 6 \cdot 10^{-6}$ or letting $$\delta = \Phi - 3.98, \tag{20}$$

$$\rho_f(\delta) \doteq \rho_f(0)(-\beta\delta^2). \tag{21}$$

There are some manmade materials, for example, some cermets, which have essentially zero temperature dependence over some temperature ranges and show excellent dimensional stability. Therefore, the fluid temperature dependence must be discussed. Substituting Equation (21) into Equation (16) we have $$F(\delta) = g(o)[M_B - \rho_f(0)V_B(1 - \beta\delta^2)] + \tag{22}$$

$$\frac{1}{2} \frac{\partial g}{\partial z} l[M_B - \rho_f(0)V_B(1 - \beta\delta^2)] + l_i M_B.$$

Letting $$M_B = \rho_f(0)V_B, \tag{23}$$

then $$F(\delta) = g(o)M_B \beta \delta^2 + \frac{1}{2} \frac{\partial g}{\partial z} M_B[l\beta\delta^2 + l_i]. \tag{24}$$

Now $1\beta\delta^2 << 1_i$ and $$F(\delta) = g(o)M_B \beta \delta^2 + \frac{1}{2} \frac{\partial g}{\partial z} M_B l_i. \tag{25}$$

To keep the variation in force due to temperature variations within about about 0.003 F(0); i.e., equivalent to 0.01 g/cc thermal error, we have $$\frac{F(0) - F(w)}{F(0)}\bigg|_{max} = 3 \cdot 10^{-3} = \frac{g(o)M_B \beta \delta^2_{max}}{\frac{1}{2} \frac{\partial g}{\partial z} M_B l_i} \tag{26}$$

$$= \frac{g(o)\beta\delta^2_{max}}{\frac{1}{2} \frac{\partial g}{\partial z} l_i}$$

$$\delta^2_{max} = \frac{3 \cdot 10^{-3} \cdot \frac{1}{2} \cdot \frac{\partial g}{\partial z} \text{ free air } l_i}{g(o)\beta} \tag{27}$$

Now $l_i \frac{\partial g}{\partial z} \cong 50 \cdot 10^{-9} \cdot g(o)$ where $l_i \cong 6$ inches \tag{28}

-continued $$So\ \delta_{max}^2 = 12 \cdot 10^{-6} \quad (29)$$

$$and\ \delta_{max} \cong \pm 3 \cdot 10^{-3}\ C.° \quad (30)$$

Thus, for temperature variations of less than $\pm 3 \cdot 10^{-3}$ °C., force variations due to such temperature variations will cause an error less than 0.003 F(0).

This level of temperature control is well within the state of the art temperature control of $\pm 5 \cdot 10^{-6}$ C.°. See, for example, *Rev. Sci. Instrum.* Vol. 45, No. 11, November 1974, pp. 1435–1444.

SYNTHETIC EXAMPLE III

MAGNITUDE OF FORCE (F)

Now we will consider the magnitude of the force F predicted by Equation (18). The means of measurement is, as illustrated, to center the float 13 between the two plates 16 and 18 (null position) and to use electrostatic forcing to keep the float 13 at the centered null position. The voltage on the plates to achieve this null position is then the measure of the vertical gradient of the vertical gravitational field.

The electrostatic force $F_{es}$ between two parallel plates is given by $$F_{es} = \frac{A\epsilon}{2d^2} E^2 \quad (31)$$

where A is the areas of the plates, $\epsilon$ is the dielectric constant of the medium, d is the separation of the plates and E is the voltage between the plates. If we consider the float to be electrically grounded, and the distance between each of the top plates and bottom plates respectively to be d we have $$F_{es} = \frac{A\epsilon}{2d^2} (E_B^2 - E_T^2) \quad (32)$$

where $E_B$ is the voltage across the bottom plates and $E_T$ is the voltage across the top plates. If we let $E_B = E_o + \delta$ and $E_T = E_o - \delta$
where $\delta$ is thus the differential voltage and $E_o$ is the common mode voltage as defined we have $$F_{es} = \frac{A\epsilon}{d^2} E_o \delta \quad (33)$$

where $E_o + \delta$ and $E_o - \delta$ must be of the same polarity. See, for example, Journal of Geophysical Research, Vol. 71, No. 18, Sept. 15, 1966, pp. 4361–4375.

Then from Equation (18) and Equation (33) with the float stationary at the null centered position $$F_{es} + F = 0.$$

$$\frac{A\epsilon}{d^2} E_o \delta + \frac{1}{2} \frac{\partial g}{\partial z} l_i M_B = 0 \quad (34)$$

or $$E_o \delta = - \frac{\frac{\partial g}{\partial z} l_i M_B d^2}{A\epsilon} \quad (35)$$

assuming a Free Air Gradient of $\sim 100\mu$ gals/ft $= \partial g/\partial z$, and of 1 mm, $l_i$ of 10 cm, A of $\pi$ cm$^2$, an $M_B$ of 35 gm, and $\epsilon = 80\epsilon_o$ for water, where $\epsilon_o$ is the dielectric constant of free space, we have $$E_o \delta = -0.045\ volt^2 \quad (36)$$

which means that if we let $E_o = 0.45$ volts, the free air gradient would force a $\delta$ or 0.1 volt to achieve a null motion; i.e., the top plate would have a voltage of 0.55 volts and the bottom plate would have 0.35 volts. A geophysical resolution of 0.01 gm/cc would be equivalent to a $\delta$ of approximately 0.3 millivolt. (Note: the plate voltages could also be $-0.55$ volts on the top and $-0.35$ volts on the bottom and the same force would be achieved equivalent to the free air gradient). In other words, an in-phase square wave with a magnitude of 0.55 volts on top plate and 0.35 volts on the bottom plate is equivalent to the free air gradient as long as the float is at an AC ground.

Although the invention has been described, as required, in terms of a preferred embodiment, it will be apparent to persons skilled in the art that other apparatus and methods are possible without departing from the principles of the invention. Thus, for example, although sensing the position of the float 13 and restoring the float 13 to its centered null position has been herein above described with reference to capacitative sensing and forcing, it will be apparent that many other ways of sensing and restoring may be employed. Thus, for example, sensing may be accomplished interferometrically, inductively, and the like; and restoring can be accomplished magnetically, by eddy current magnetic effects, electromagnetically and the like. As hereinabove described, the invention is described in terms of a float which is balanced at its centered null position at a zero gradient; however, for small deviations from a natural balance at a zero gradient, the float can also be maintained at the null position by forcing. And similarly for other features of the invention, many other variations will be apparent to those skilled in the art.

Figure 6:
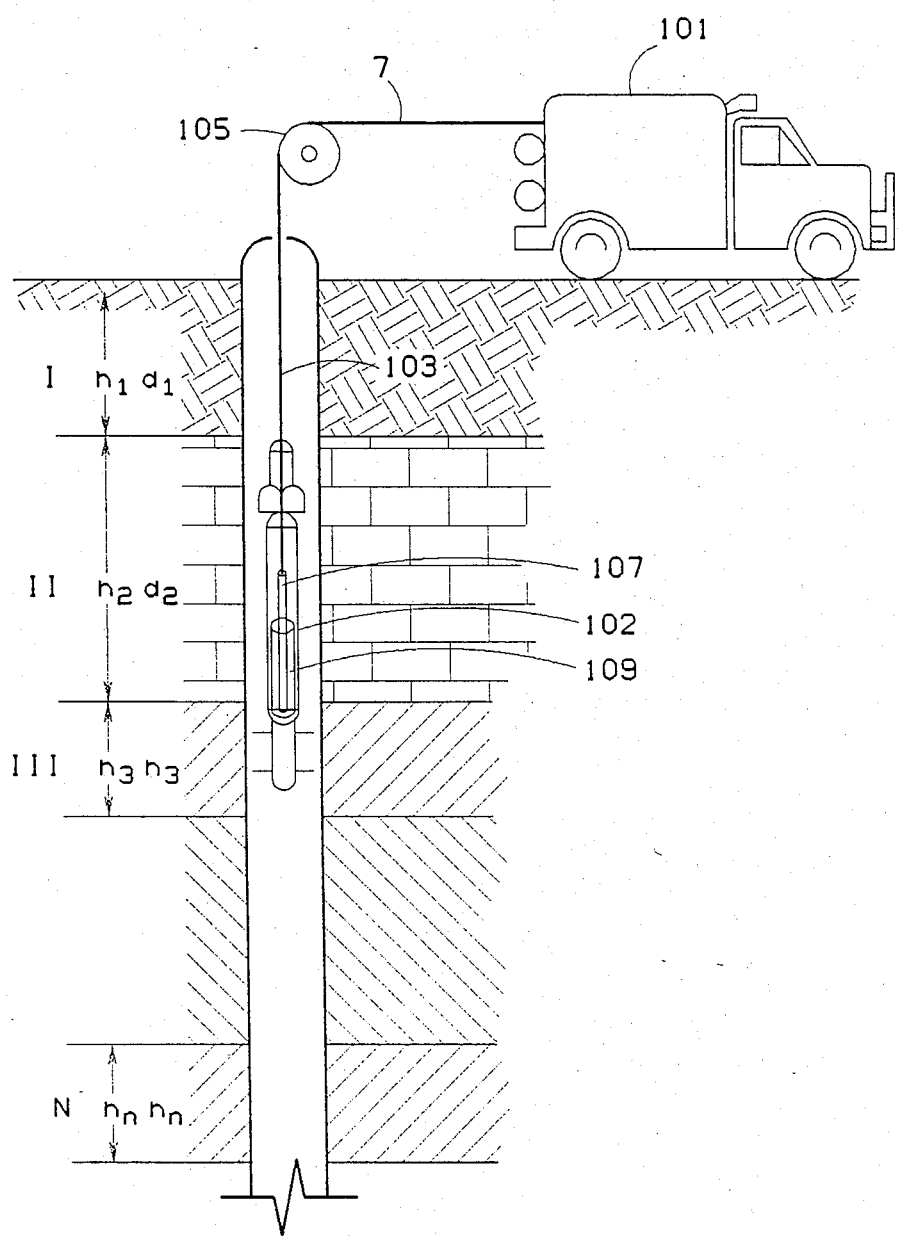
FIG. 6 illustrated schematically apparatus and method for oil and gas exploration in the vicinity of a borehole in accordance with the invention.

To further illustrate the invention, the use of the invention in oil and gas exploration in the vicinity of a borehole is illustrated in FIG. 6. Referring now, in detail, to FIG. 6, FIG. 6 depicts generally a method of oil and gas exploration utilizing the apparatus and method in accordance with the invention for oil and gas exploration in the context of a borehole. Referring now to FIG. 6 in detail, there is illustrated in schematic form apparatus for making measurements of the vertical gradient of the vertical gravitational field in a borehole in accordance with the invention. A conventional logging truck 101 at the earth's surface controls a gravity sonde 102 which is lowered into a borehole on a logging cable 103 over one or more sheaves 105 suspended over the borehole. The cable 103 may be a multiconductor cable such as is conventionally used for electrical well logging purposes and is functional, inter alia, for transmitting the signal from the sonde to a receiver such as a recorder at the surface. The sonde 102 has apparatus 107 in accordance with the invention mounted therein, for example, by gimbel 109 to maintain the apparatus generally vertical and in alignment with the vertical component of the vertical gravitational field. The sonde 102 while being lowered through the borehole traverses a number of earth formations designated by numerals I, II, III . . . , N each of which has a different density designated by $d_1, d_2, d_3, \ldots, d_n$ with the thickness of the respective formations designated by $h_1, h_2, h_3, \ldots, h_n$.

If it is desired to determine the density $d_2$ of layer II, for example, measurements of the vertical gradient of the vertical gravitational field can be taken in layer II, and the density of the layer can be determined from the formula $$d = \frac{F}{4\pi G} - \frac{\partial g_z/\partial z}{4\pi G}$$

where d is the density of the layer being determined, F is the free air gradient, G is the universal gravitational constant, and $\partial g_z/\partial z$ is the vertical gradient of the vertical component of the earth's gravitational field within the layer. This is a well known relationship and will not be further discussed herein.

Since $\partial g_z/\partial z$ is determined directly in accordance with the invention, only one measurement (i.e., at one depth) is required to determine that quantity although, for accuracy, more than one may be taken. Potentially, gravity gradient determination using the invention may even eliminate the need to halt the sonde during measurements and permit a continuous log to be developed since the method and apparatus according to the invention are not inherently incompatible with continuous logging.

Although the invention has been described in terms of a specific preferred embodiment as required, the invention is not limited thereto but to apparatus and methods as defined in the claims hereinafter appended.

What is claimed is:

1. Apparatus comprising:

a generally cylindrical housing having a vertical axis and containing a fluid;

float means suspended within said fluid and having an axis z oriented with the vertical gravitational field g(z) for responding to the vertical gradient $\partial g_z/\partial z$ of the vertical gravitational field g(z) by producing a force representative of the vertical gradient $\partial g_z/\partial z$ only of the vertical gravitational field, the float means having a weight substantially supported by its buoyancy in the fluid and having a mass distribution of a low mass-high mass dipole along the axis z, the force produced being representative of the vertical gradient $\partial g_z/\partial z$ and tending to a change of position of the float means in the fluid, the float means having an electrically conductive surface and being generally cylindrical in shape having a first end, a second end, and a radial surface and having a vertical axis generally coaxial with the vertical axis of the housing;

sensing and restoring means responsive to a change in position of the float means from a null position for generating and applying to the float means a countervailing force opposing the force representative of the vertical gradient $\partial g_z/\partial z$ of the vertical gravitational field and electrostatically maintaining the float means at the null position, the countervailing force thus being representative of the vertical gradient $\partial g_z/\partial z$ of the vertical gravitational field, the sensing and restoring means comprising a first capacitive element including a first electrically conductive plate adjacent the first end of the float means, a second capacitive element including a second electrically conductive plate adjacent the second end of the float means, a third capacitive element comprising a third electrically conductive plate adjacent the radial surface of the float means, and wherein at least the first capacitive element and the second capacitive element vary in capacitance responsive to the force tending to vertical displacement of the float means; and signal means for taking off a signal representative of the thus generated countervailing force representative of the vertical gradient $\partial g_z/\partial z$ of the vertical gravitational field.

2. Apparatus as in claim 1 wherein the sensing and restoring means further comprises:

a first frequency source having a first output and a second output 180 degrees out of phase with the first output, the first output being electrically connected to the first electrically conductive plate and the second output being electrically connected to the second electrically conductive plate;

coherent detector means having a first input electrically connected to the third electrically conductive plate and a second input electrically connected to the second output of the first frequency source for producing a direct current voltage having a polarity and a magnitude determined by the direction and magnitude, respectively, of the force tending to vertical displacement of the float means; and integrator means for producing a signal representative of the force tending to vertical displacement of the float means.

3. Apparatus as in claim 2 wherein the sensing and restoring means comprises:

a multiplier for multiplying a first input signal x by a second input signal y to produce an output signal $z=xy$, wherein the first input signal x is the signal representative of the force tending to vertical displacement of the float means produced by the integrator means;

a second frequency source having a first output electrically provided as the second input signal y to the multiplier and further electrically provided to the third electrically conductive plate;

an inverter electrically connected to the output signal z of the multiplier for producing an inverted signal $\overline{z}$;

means electrically providing the output signal z of the multiplier to the first electrically conductive plate; and means electrically providing the output signal $\overline{z}$ of the inverter to the second electrically conductive plate.

4. Apparatus as in claim 3 wherein the third capacitive element is developed between a third electrically conductive plate adjacent the radial surface of the float means and a fourth electrically conductive plate electrically connected to the third electrically conductive plate adjacent the radial surface of the float means, the third electrically conductive plate and the fourth electrically conductive plate being adjacent spaced apart relationships and having a gap there between; and further comprising:

positioning means mounted in the gap for maintaining the vertical axis of the float means generally coaxial with the vertical axis of the housing.

5. Apparatus as in claim 4 wherein said positioning means is further functional for controlling the temperature of said fluid.

6. Apparatus for lowering into the earth and for determining the density of formations in the earth, the Apparatus comprising:

a sonde for lowering into the earth;

first means in the sonde for generating a signal representative of the vertical gradient $\partial g_z/\partial z$ of the vertical gravitational field $g(z)$ at each point adjacent the formation that a measurement is taken, the first means comprising a housing containing a fluid and float means suspended within said fluid and having an axis z oriented with the vertical gravitational field $g(z)$ for responding to the vertical gradient $\partial g_z/\partial z$ of the vertical gravitational field $g(z)$ by producing a force representative of the vertical gradient of the vertical gravitational field, the float means having a weight substantially supported by its buoyancy in the fluid and having a mass distribution of a low mass-high mass dipole along the axis z, the force produced being representative of the vertical gradient $\partial g_z/\partial z$ and tending to a change of position of the float means in the fluid, and sensing means responsive to a change in position of the float means from a null position for producing the signal representative of the vertical gradient of the vertical gravitational field;

restoring means responsive to the position of the float means for maintaining the float means at the null position; and second means connected to the first means for transmitting the thus generated signal representative of the vertical gradient of the vertical gravitational field to a receiver.

7. Apparatus as in claim 6 wherein:

the restoring means is functional for generating and applying to the float means a force opposing the force representative of the vertical gradient of the vertical gravitational field.

8. Apparatus as in claim 7 wherein:

the housing is a generally cylindrical housing having a vertical axis;

the float means has an electrically conductive surface and is generally cylindrical in shape having a first end, a second end, and a radial surface and having a vertical axis generally coaxial with the vertical axis of the housing;

the sensing means comprises a first capacitive element including a first electrically conductive plate adjacent the first end of the float means, a second capacitive element including a second electrically conductive plate adjacent the second end of the float means, a third capacitive element comprising a third electrically conductive plate adjacent the radial surface of the float means, and wherein at least the first capacitive element and the second capacitive element vary in capacitance responsive to the force tending to vertical displacement of the float means.

9. Apparatus as in claim 8 wherein the sensing means further comprises:

a first frequency source having a first output and a second output 180 degrees out of phase with the first output, the first output being electrically connected to the first electrically conductive plate and the second output being electrically connected to the second electrically conductive plate;

coherent detector means having a first input electrically connected to the third electrically conductive plate and a second input electrically connected to the second output of the first frequency source for producing a direct current voltage having a polarity and a magnitude determined by the direction and magnitude, respectively, of the force tending to vertical displacement of the float means; and integrator means for producing a signal representative of the force tending to vertical displacment of the float means.

10. Apparatus as in claim 9 wherein the restoring means comprises:

a multiplier for multiplying a first input signal x by a second input signal y to produce an output signal $z=xy$, wherein the first input signal x is the signal representative of the force tending to vertical displacement of the float means produced by the integrator means;

a second frequency source having a first output electrically provided as the second input signal y to the multiplier and further electrically provided to the third electrically conductive plate;

an inverter electrically connected to the output signal z of the multiplier for producing an inverted signal $\bar{z}$, means electrically providing the output signal z of the multiplier to the first electrically conductive plate; and means electrically providing the output signal $\bar{z}$ of the inverter to the second electrically conductive plate.

11. Apparatus as in claim 8 wherein the third capacitive element is developed between a third electrically conductive plate adjacent the radial surface of the float means and a fourth electrically conductive plate electrically connected to the third electrically conductive plate adjacent the radial surface of the float means, the third electrically conductive plate and the fourth electrically conductive plate being adjacent spaced apart relationship and having a gap there between; and further comprising:

positioning means mounted in the gap for maintaining the vertical axis of the float means generally coaxial with the vertical axis of the housing.

12. Apparatus as in claim 11 wherein said positioning means is further functional for controlling the temperature of said fluid.

13. A method for determining the density of a formation in the earth comprising:

at each point adjacent the formation that a measurement is taken generating a signal representative of the vertical gradient $\partial g_z/\partial z$ of the vertical gravitational field, wherein the Method comprises the steps of generating a force representative of only the vertical gradient $\partial g_z/\partial z$ of the vertical gravitational field acting on a float suspended in a fluid, the force tending to vertical displacement of the float in the fluid;

sensing the force by means dielectrically separated from the float and responsive to the force for generating a signal representative of the vertical gradient of the vertical gravitational field;

generating a countervailing force to the force representative of the vertical gradient of the vertical gravitational field; and applying the countervailing force to the float to maintain the float at a null position in the fluid.

14. A method for determining the density of a formation in the earth comprising:

lowering a sonde in the vicinity of the formation and at each point adjacent the formation that a measurement is taken generating a signal representative of the vertical gradient $\partial g_z/\partial g$ of the vertical gravitational field, wherein the Method comprises the steps of generating a force representative of only the vertical gradient $\partial g_z/\partial z$ of the vertical gravitational field acting on a float suspended in a fluid, the force tending to vertical displacement of the float in the fluid;

sensing the force by means dielectrically separated from the float and responsive to the force for generating a signal representative of the vertical gradient of the vertical gravitational field;

generating a countervailing force to the force representative of the vertical gradient of the vertical gravitational field; and applying the countervailing force to the float to maintain the float at a null position in the fluid.

* * * * *

UNITED STATES PATENT OFFICE
CERTIFICATE OF CORRECTION

PATENT NO. : 4,513,618

DATED : April 30, 1985

INVENTOR(S) : Theodore V. Lautzenhiser

It is certified that error appears in the above-identified patent and that said Letters Patent are hereby corrected as shown below:

Column 3, line 67, "radical" should read --radial--.

Column 7, line 16, "for $0 \leq z < l_i$" should read --for $0 \leq z < l_i$--.

Line 17, "$\rho B$ for $l_i < z \leq 1$" should read --$\rho_B$ for $l_i < z \leq 1$--.

Column 8, line 25, "$(-\beta\delta^2)$ should read --$(1 - \beta \delta^2)$--.

line 65, "$\frac{\partial g}{\partial g}$" should read --$\frac{\partial g}{\partial z}$--.

Column 12, line 58, Claim 4, "relationships" should read --relationship--.

Signed and Sealed this

First Day of September, 1987

Attest:

DONALD J. QUIGG

Attesting Officer　　　　Commissioner of Patents and Trademarks